(12) United States Patent
Song

(10) Patent No.: US 11,507,238 B2
(45) Date of Patent: Nov. 22, 2022

(54) TOUCH SENSOR AND DISPLAY DEVICE INCLUDING THE SAME

(71) Applicant: SAMSUNG DISPLAY CO., LTD., Yongin-si (KR)

(72) Inventor: Sang June Song, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/353,811

(22) Filed: Jun. 22, 2021

(65) Prior Publication Data

US 2022/0121321 A1    Apr. 21, 2022

(30) Foreign Application Priority Data

Oct. 19, 2020  (KR) .................. 10-2020-0135498

(51) Int. Cl.
    *G06F 3/044*  (2006.01)
(52) U.S. Cl.
    CPC .......... *G06F 3/0446* (2019.05); *G06F 3/0443* (2019.05); *G06F 2203/04111* (2013.01)
(58) Field of Classification Search
    CPC ............. G06F 3/0446; G06F 3/0443; G06F 2203/04111
See application file for complete search history.

(56) References Cited

U.S. PATENT DOCUMENTS

| | | | | |
|---|---|---|---|---|
| 9,665,194 B2* | 5/2017 | Ito | .................. | G06F 3/04164 |
| 10,340,316 B2* | 7/2019 | Lee | .................. | H01L 27/3262 |
| 10,804,336 B2* | 10/2020 | Kim | .................. | H01L 27/3258 |
| 10,852,896 B2* | 12/2020 | Nakayama | ............ | G06F 3/0445 |
| 10,949,008 B2* | 3/2021 | Ryu | .................. | G06F 3/0412 |
| 10,963,112 B1* | 3/2021 | Hsu | .................. | G06F 3/0446 |
| 10,978,666 B2* | 4/2021 | Park | .................. | H01L 27/3234 |
| 11,029,788 B2* | 6/2021 | Park | .................. | G06F 1/1626 |
| 11,088,221 B2* | 8/2021 | Cho | .................. | H01L 27/323 |
| 11,121,192 B2* | 9/2021 | Han | .................. | H01L 51/5281 |
| 11,275,474 B2* | 3/2022 | Yang | .................. | G06F 3/0446 |
| 2011/0227858 A1* | 9/2011 | An | .................. | G06F 3/0317 345/173 |
| 2012/0019473 A1* | 1/2012 | Edwards | .............. | G06F 3/0446 345/174 |
| 2014/0055383 A1* | 2/2014 | Kim | .................. | G06F 3/0448 345/173 |
| 2014/0320765 A1* | 10/2014 | Jiang | .................. | G06F 3/041 349/12 |

(Continued)

*Primary Examiner* — Amy Onyekaba

(74) *Attorney, Agent, or Firm* — H.C. Park & Associates, PLC

(57) ABSTRACT

A touch sensor for a display device includes: a base including a sensing area and a non-sensing area; first sensing electrodes disposed on the sensing area, extending in a first direction, and arranged in a second direction different from the first direction; second sensing electrodes disposed on the sensing area, extending in the second direction, and arranged in the first direction; first signal lines disposed on a first peripheral area of the non-sensing area and being connected to first portions of the first sensing electrodes, respectively; and a first connector connected to second portions of the first sensing electrodes, wherein the first connector electrically connects adjacent ones of first sensing electrodes to each other.

17 Claims, 13 Drawing Sheets

(56) References Cited

U.S. PATENT DOCUMENTS

| | | | |
|---|---|---|---|
| 2015/0277633 A1* | 10/2015 | Jiang | G02F 1/133512 345/174 |
| 2015/0301637 A1* | 10/2015 | Chen | G06F 3/041 345/173 |
| 2015/0373839 A1* | 12/2015 | Kim | G06F 3/0412 345/174 |
| 2015/0376466 A1* | 12/2015 | Mitamura | G06F 3/0445 428/41.5 |
| 2016/0239131 A1* | 8/2016 | Kang | G06F 3/0446 |
| 2017/0024066 A1* | 1/2017 | Kim | G06F 3/0412 |
| 2017/0115800 A1* | 4/2017 | Lee | G06F 3/0443 |
| 2017/0205926 A1* | 7/2017 | Noguchi | G02F 1/133305 |
| 2017/0220163 A1* | 8/2017 | Kurasawa | G06F 3/04166 |
| 2017/0351132 A1* | 12/2017 | Kanari | G06F 3/0416 |
| 2018/0032194 A1* | 2/2018 | Koide | G11C 19/287 |
| 2018/0101270 A1* | 4/2018 | Cho | G06F 3/0446 |
| 2018/0107330 A1* | 4/2018 | Meng | G06F 3/0443 |
| 2018/0150170 A1* | 5/2018 | Oh | H01L 51/5284 |
| 2018/0164916 A1* | 6/2018 | Seo | G06F 3/0443 |
| 2018/0164917 A1* | 6/2018 | Seo | G06F 3/041 |
| 2018/0210577 A1* | 7/2018 | Chan | G06F 3/04164 |
| 2018/0308903 A1* | 10/2018 | Jeong | H01L 27/3276 |
| 2018/0348926 A1* | 12/2018 | Su | H01L 51/0023 |
| 2018/0373359 A1* | 12/2018 | Han | G06F 3/04164 |
| 2019/0051708 A1* | 2/2019 | Jeong | H01L 27/323 |
| 2019/0064960 A1* | 2/2019 | Na | G06F 3/0412 |
| 2019/0189731 A1* | 6/2019 | Managaki | H01L 51/5253 |
| 2019/0214595 A1* | 7/2019 | Park | H01L 27/3234 |
| 2019/0220123 A1* | 7/2019 | Kanaya | G06F 3/04164 |
| 2019/0285954 A1* | 9/2019 | Yoshida | G06F 3/04164 |
| 2019/0286257 A1* | 9/2019 | Choi | B32B 3/266 |
| 2019/0294278 A1* | 9/2019 | Kim | G06F 3/04164 |
| 2019/0332200 A1* | 10/2019 | Lee | G06F 3/044 |
| 2019/0332211 A1* | 10/2019 | Jeon | G06F 3/0412 |
| 2019/0369781 A1* | 12/2019 | Hwang | G06F 3/0446 |
| 2019/0391687 A1* | 12/2019 | Tsai | G06F 3/0445 |
| 2020/0033967 A1* | 1/2020 | Yang | G06F 3/0443 |
| 2020/0035762 A1* | 1/2020 | Kim | H01L 27/323 |
| 2020/0042123 A1* | 2/2020 | Kim | H01L 51/5275 |
| 2020/0057530 A1* | 2/2020 | Moon | H01L 27/3276 |
| 2020/0064968 A1* | 2/2020 | Kim | H01L 27/3276 |
| 2020/0083299 A1* | 3/2020 | Kim | G06F 3/0446 |
| 2020/0089350 A1* | 3/2020 | Han | G06F 3/0448 |
| 2020/0089368 A1* | 3/2020 | Shim | H01L 27/323 |
| 2020/0104011 A1* | 4/2020 | Liang | G06F 3/0446 |
| 2020/0110497 A1* | 4/2020 | Jin | G06F 3/0416 |
| 2020/0110498 A1* | 4/2020 | Lee | G06F 3/04164 |
| 2020/0159369 A1* | 5/2020 | Seo | G06F 3/0443 |
| 2020/0167041 A1* | 5/2020 | Jeong | G06F 3/0443 |
| 2020/0168671 A1* | 5/2020 | Jang | G06F 3/04164 |
| 2020/0173949 A1* | 6/2020 | Lee | H01L 27/323 |
| 2020/0175900 A1* | 6/2020 | Han | G06F 3/0443 |
| 2020/0175901 A1* | 6/2020 | Lee | G06F 3/04164 |
| 2020/0192511 A1* | 6/2020 | Ye | G06F 3/047 |
| 2020/0201509 A1* | 6/2020 | Kadowaki | G06F 3/0445 |
| 2020/0243610 A1* | 7/2020 | Han | H01L 51/5237 |
| 2020/0258913 A1* | 8/2020 | Park | H01L 51/0097 |
| 2020/0293137 A1* | 9/2020 | Yang | G06F 3/0446 |
| 2020/0312918 A1* | 10/2020 | Lee | G06F 3/04144 |
| 2020/0319735 A1* | 10/2020 | Kim | G06F 3/045 |
| 2020/0328257 A1* | 10/2020 | Kim | H01L 51/5056 |
| 2020/0379602 A1* | 12/2020 | Zeng | G06V 40/13 |
| 2021/0151516 A1* | 5/2021 | Ding | H01L 27/3276 |
| 2021/0200379 A1* | 7/2021 | Youk | H01Q 1/38 |
| 2022/0011897 A1* | 1/2022 | Lee | G06F 3/0412 |
| 2022/0222482 A1* | 7/2022 | Schilit | G06K 9/623 |

\* cited by examiner

TOUCH SENSOR AND DISPLAY DEVICE INCLUDING THE SAME

CROSS-REFERENCE TO RELATED APPLICATION

This application claims priority from and the benefit of Korean Patent Application No. 10-2020-0135498 filed on Oct. 19, 2020, which is hereby incorporated by reference for all purposes as if fully set forth herein.

BACKGROUND

Field

Embodiments of the invention relate generally to a display device and more specifically, to a display device including a touch sensor.

Discussion of the Background

A display device may include a display panel and a touch sensor overlapping the display panel. For example, the touch sensor may be attached to one surface of the display panel, or may be manufactured integrally with the display panel. The touch sensor may include a touch electrode unit, in which touch electrodes are disposed, a pad unit, and a line unit including touch lines connecting the touch electrodes to the pad unit.

Recently, there has been a trend in the industry to maximize the area in which an image is displayed, which requires the non-display area disposed outside the display area, e.g., a dead space, to be minimized.

The above information disclosed in this Background section is only for understanding of the background of the inventive concepts, and, therefore, it may contain information that does not constitute prior art.

SUMMARY

Applicant realized that the dead space of a display device including a touch sensor may be increased due to the arrangement of routing lines for connecting the sensing electrodes of the touch sensor to a pad unit.

Display devices including touch sensors constructed according to the principles and illustrative implementations of the invention are capable of minimizing the dead space of the display device. For example, connectors that may be in the form of connection patterns may connect adjacent sensing electrodes of the touch sensor to each other.

Additional features of the inventive concepts will be set forth in the description which follows, and in part will be apparent from the description, or may be learned by practice of the inventive concepts.

According to one aspect of the invention, a touch sensor for a display device includes: a base including a sensing area and a non-sensing area; first sensing electrodes disposed on the sensing area, extending in a first direction, and arranged in a second direction different from the first direction; second sensing electrodes disposed on the sensing area, extending in the second direction, and arranged in the first direction; first signal lines disposed on a first peripheral area of the non-sensing area and being connected to first portions of the first sensing electrodes, respectively; and a first connector connected to second portions of the first sensing electrodes, wherein the first connector electrically connects adjacent ones of first sensing electrodes to each other.

The first connector may be disposed on a second peripheral area of the non-sensing area opposite to the first peripheral area of the non-sensing area.

The first peripheral area of the non-sensing area may be adjacent to a first side of the sensing area, and the second peripheral area of the non-sensing area may be adjacent to a second side of the sensing area opposite to the first side of the sensing area.

The touch sensor may further include second signal lines disposed on a third peripheral area of the non-sensing area and being connected to third portions of the second sensing electrodes, respectively.

The touch sensor may further include a second connector connected to fourth portions of the second sensing electrodes, respectively, wherein the second connector may electrically connect adjacent ones of the second sensing electrodes to each other.

The second connector may be disposed on a fourth peripheral area of the non-sensing area.

The third peripheral area of the non-sensing area may be adjacent to a third side of the sensing area, and the fourth peripheral area of the non-sensing area may be adjacent to a fourth side opposite to the third side of the sensing area.

The second connector may be disposed on the sensing area.

The fourth portions of the adjacent ones of second sensing electrodes may be integrally formed with the second connector.

The touch sensor may further include third signal lines disposed on a fourth peripheral area of the non-sensing area and connected to fourth portions of respective ones of the second sensing electrodes.

The first connector may include a first connection pattern disposed on the sensing area.

The second portions of the adjacent ones of first sensing electrodes may be integrally formed with the first connection pattern.

The base may include a base layer, the first connector may include a first connection pattern, the first portions of the first sensing electrodes may include first ends and the second portions of the first sensing electrodes may include second ends opposite the first ends, wherein the touch sensor further includes an insulating layer, and wherein the first connection pattern may be disposed on the base layer, the insulating layer may be disposed on the base layer to cover the first connection pattern, the first sensing electrodes may be disposed on the insulating layer, and the second ends of the first sensing electrodes may be connected to the first connection pattern through a contact hole passing through the insulating layer.

The base may include a base layer, the second connector may include a second connection pattern, the third portions of the second sensing electrodes may include third ends and the fourth portions of the second sensing electrodes may include fourth ends opposite the third ends, wherein the touch sensor may further include an insulating layer, wherein the second connection pattern may be disposed on the base layer, the insulating layer may be disposed on the base layer to cover the second connection pattern, the second sensing electrodes may be disposed on the insulating layer, and the fourth ends of the second sensing electrodes may be connected to the second connection pattern through a contact hole passing through the insulating layer.

Each of the first sensing electrodes may include first sensing cells arranged in the first direction, and each of the second sensing electrodes may include second sensing cells arranged in the second direction.

The touch sensor may further include a bridge connecting adjacent ones of the first sensing cells to each other.

The bridge may include a bridge pattern and may further include an insulating layer, wherein the bridge pattern may be disposed on the base, the insulating layer may be disposed on the base to cover the bridge pattern, the first sensing cells and the second sensing cells may be disposed on the insulating layer, and the first sensing cells may be connected to the bridge pattern through a contact hole passing through the insulating layer.

According to another aspect of the invention, a display device includes: a display panel; and a touch sensor disposed on the display panel, wherein the touch sensor includes: a base including a sensing area and a non-sensing area; first sensing electrodes disposed on the sensing area, extending in a first direction, and arranged in a second direction different from the first direction; second sensing electrodes disposed on the sensing area, extending in the second direction, and arranged in the first direction; first signals lines disposed on a first peripheral area of the non-sensing area and being connected to first portions of the first sensing electrodes, respectively; and a first connector connected to second portions of the first sensing electrodes, wherein the first connector electrically connects adjacent ones of the first sensing electrodes to each other.

The display panel may include: a substrate including a display area and a non-display area; a circuit element disposed on the substrate; and a display element disposed on the circuit element.

The sensing area may overlap the display area, and the non-sensing area may overlap the non-display area.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
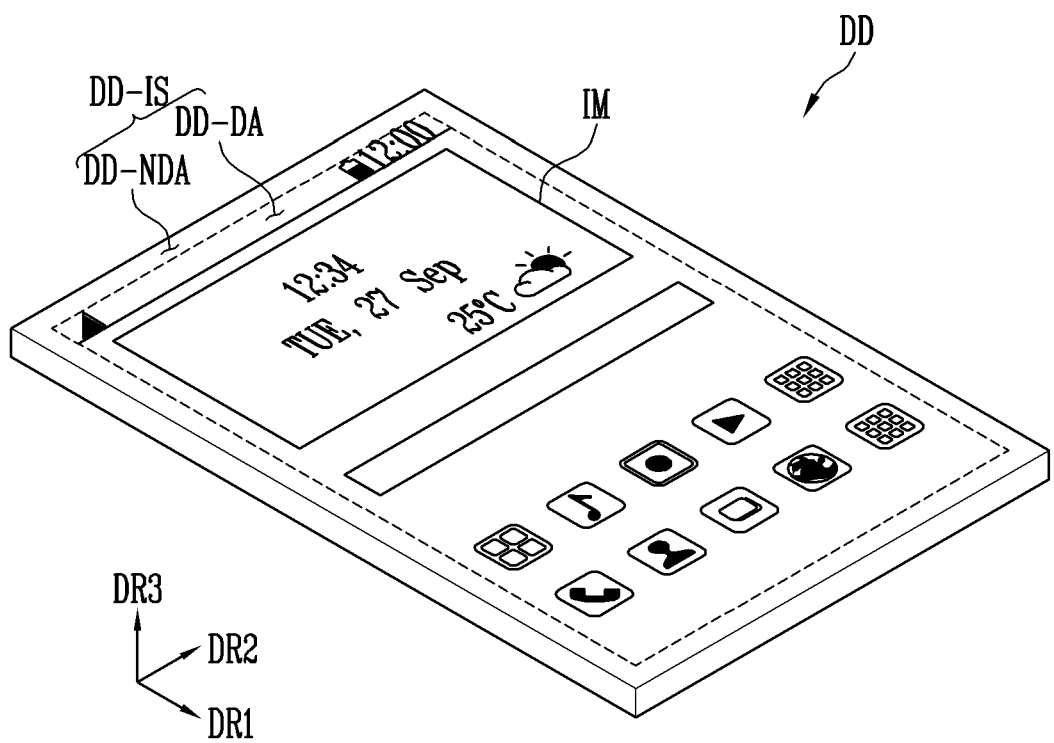
FIG. 1 is a perspective view of an embodiment of a display device constructed according to the principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments of the invention will be described in more detail with reference to the accompanying drawings.

FIG. 1 is a perspective view of an embodiment of a display device constructed according to the principles of the invention.

Referring to FIG. 1, a display device DD may display an image IM on a display surface DD-IS. The display surface DD-IS may be substantially parallel to a surface defined by a first direction DR1 and a second direction DR2. A third direction DR3 may indicate a normal direction of the display surface DD-IS, e.g., the thickness direction of the display device DD.

Front surfaces (e.g., upper surfaces) and rear surfaces (e.g., lower surfaces) of members, layers, or units described below may be identified by the third direction DR3. However, the first, second, and third directions DR1, DR2, and DR3 are only examples, and the directions indicated by the first, second, and third directions DR1, DR2, and DR3 are relative concepts and may be converted to other directions. Hereinafter, the first, second, and third directions are directions indicated by the first, second, and third directions DR1, DR2, and DR3, and the same reference numerals are assigned thereto.

The display device DD illustrated in FIG. 1 may have a substantially flat display surface. However, the embodiments are not limited thereto, and the display device DD may have various types of display surfaces capable of displaying an image, such as a curved display surface or a three-dimensional display surface. When the display device DD has a three-dimensional display surface, the three-dimensional display surface may include, for example, a plurality of display areas facing different directions. The three-dimensional display surface may be implemented as a polygonal columnar display surface.

The display device DD may be a flexible display device. For example, the display device DD may take the form of a foldable display device, a bendable display device, a rollable display device, and the like. Embodiments are not limited thereto, and may take the form of a rigid display device.

As illustrated in FIG. 1, the display surface DD-IS of the display device DD may include a display area DD-DA in which the image IM is displayed, and a non-display area DD-NDA adjacent to the display area DD-DA. The non-display area DD-NDA is an area in which an image is not displayed. The non-display area DD-NDA may be disposed outside the display area DD-DA.

Figure 2A:
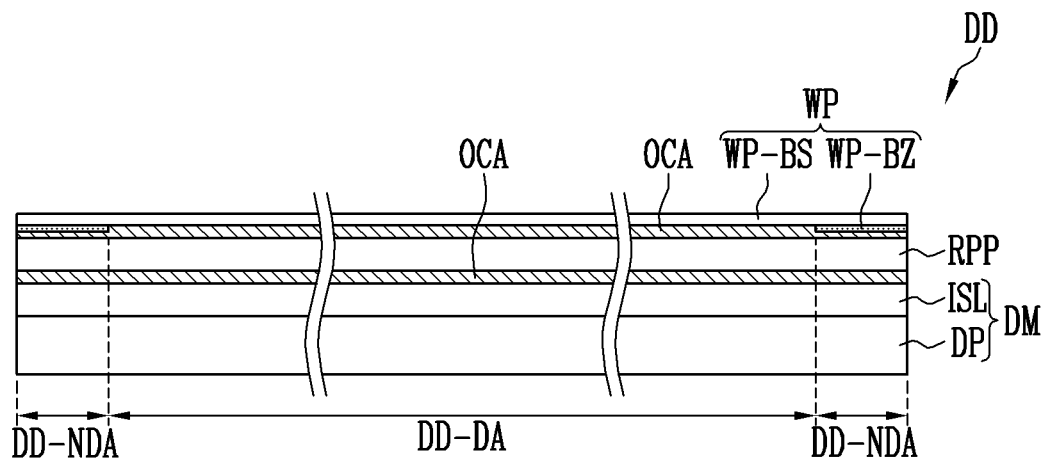
FIGS. 2A, 2B, and 2C are cross-sectional views of embodiments of the display device of FIG. 1.
Figure 2B:
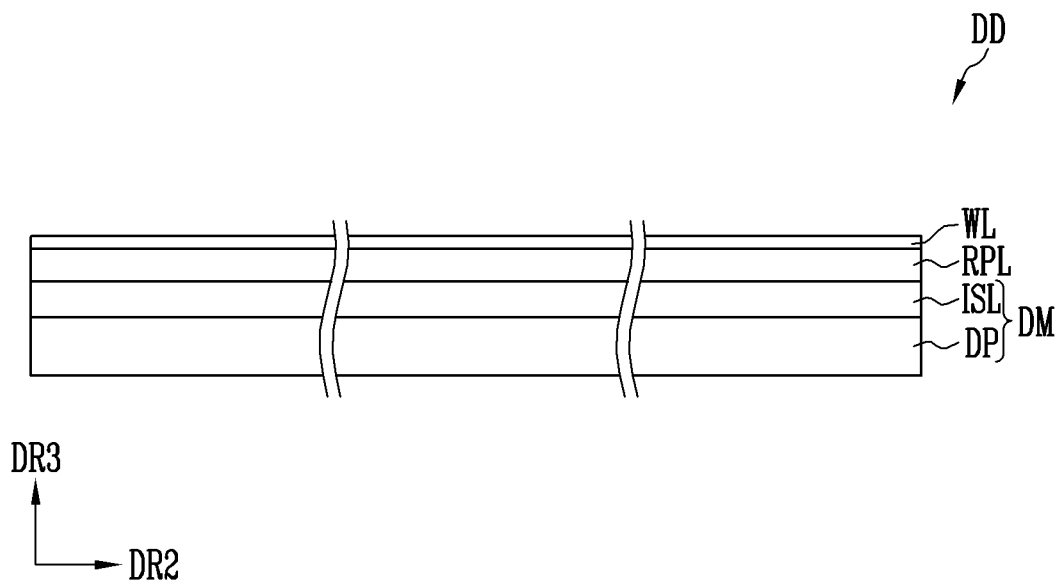
Figure 2C:
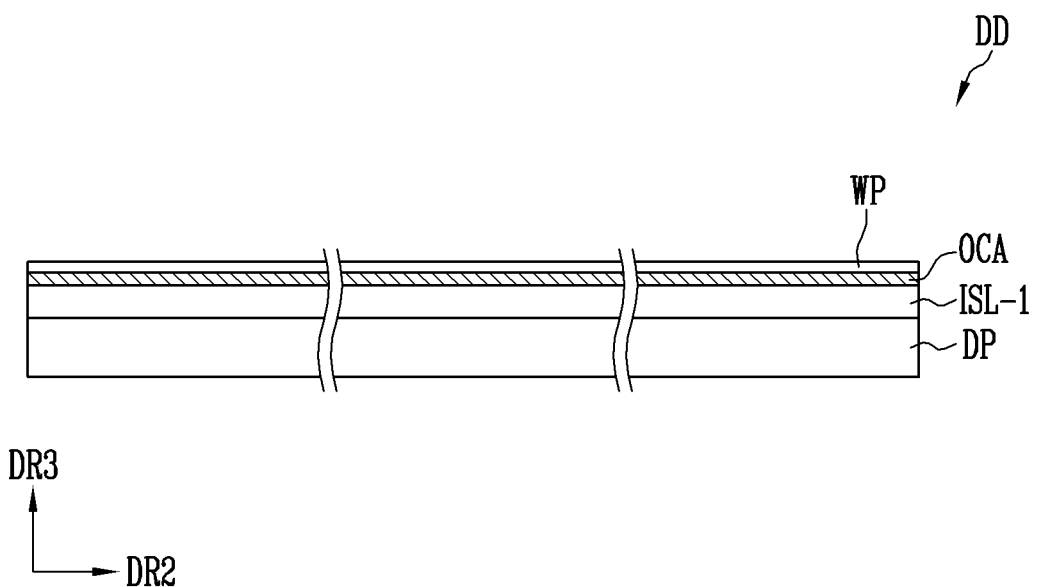

FIGS. 2A, 2B, and 2C are cross-sectional views of embodiments of the display device of FIG. 1.

FIGS. 2A, 2B, and 2C are simply illustrated so as to explain the stacking relationship of a functional panel and/or functional units constituting the display device DD.

Referring to FIGS. 2A, 2B, and 2C, the display device DD may include a display panel DP, an input sensing unit ISL or ISL-1 (e.g., a touch sensor), and a window unit WL or WP. The display device DD may further include a reflection prevention unit.

At least some elements of the display panel DP, the input sensing units ISL and ISL-1, and the window units WL and WP may be formed by continuous processes, or at least some elements may be bonded to each other through an adhesive member. The adhesive member may include a typical adhesive or pressure-sensitive adhesive. The adhesive member illustrated in FIGS. 2A and 2C may be, for example, an optical clear adhesive (OCA).

In an embodiment, the display panel DP may include a substrate, a circuit element, a display element, and an encapsulation layer.

The circuit element may be disposed on the substrate and may include a signal line, a driving circuit of a pixel, and the like.

In an embodiment, the display element may include a pixel defining film and a light emitting element. The display element may be disposed on the circuit element and may be electrically connected to the circuit element. For example, the light emitting element may be implemented as an organic light emitting diode. As another example, the light emitting element may be implemented as an inorganic light emitting diode, e.g., a micro light emitting diode (LED) or a quantum dot light emitting diode. Further, the light emitting element may be an element including a combination of an organic material and an inorganic material. The display element may constitute a pixel. In an embodiment, the pixel may include a single light emitting element, but in another embodiment, the pixel may include a plurality of light emitting elements, and the plurality of light emitting elements may be connected in series, parallel, or a combination thereof with each other.

The encapsulation layer may be disposed to cover and seal the display element. The encapsulation layer may include at least one organic film and at least one inorganic film. The encapsulation layer may be a base layer of the input sensing units ISL and ISL-1.

In an embodiment, the input sensing units ISL and ISL-1 may sense a contact or input by an external medium such as a hand or a pen with respect to the display surface DD-IS of the display device DD.

In FIGS. 2A, 2B, and 2C, each of components/elements (e.g., the input sensing units ISL and ISL-1 and the window units WL and WP) formed by the continuous processes with other components/elements is referred to as a "layer". Each of components/elements (e.g., the touch sensors and the window units) bonded to other components/elements is referred to as a "panel".

The input sensing units ISL and ISL-1 and the window units WL and WP may be referred to as input sensing panels and window panels WP, or input sensing layers ISL and window layers WL according to the presence or absence of the base layer.

In an embodiment, as illustrated in FIG. 2A, the display device DD may include a display panel DP, an input sensing layer ISL, a reflection prevention panel RPP, and a window panel WP.

In an embodiment, the input sensing layer ISL may be directly disposed on the display panel DP. As noted above, the expression "an element or layer B is directly disposed on another element or layer A" means that a separate adhesive layer/adhesive member is not disposed between the elements/layers A and B. After the element or layer A is formed, the another element or layer B may be formed on a base surface provided by the element or layer A by continuous processes.

A part including the display panel DP and the input sensing layer ISL disposed on the display panel DP may be defined as a display module DM. An optical clear adhesive (OCA) may be disposed between the display module DM and the reflection prevention panel RPP, and between the reflection prevention panel RPP and the window panel WP.

The input sensing layer ISL may be disposed in or on the display panel DP.

In an embodiment, the display panel DP may be an emissive display panel, but embodiments are not limited thereto. For example, the display panel DP may be an organic light emitting display panel or a quantum dot light emitting display panel.

The reflection prevention panel RPP may prevent or reduce light reflection, e.g., the reflectance of external light incident from the upper side of the window panel WP. In an embodiment, the reflection prevention panel RPP may include a retarder and a polarizer. The retarder may be a film-type retarder or a liquid crystal coating-type retarder and may include a $\lambda/2$ retarder and/or a $\lambda/4$ retarder. Also, the polarizer may be a film-type polarizer or a liquid crystal coating-type polarizer.

In an embodiment, the reflection prevention panel RPP may include color filters. The color filters have a predetermined arrangement. The arrangement of the color filters may be determined in consideration of the emission colors of the pixels included in the display panel DP. The reflection prevention panel RPP may further include a black matrix adjacent to the color filters.

In an embodiment, the window panel WP may include a base film WP-BS and a light blocking pattern WP-BZ. The base film WP-BS may include a glass substrate and/or a synthetic resin film. The base film WP-BS may be a single layer, but embodiments are not limited thereto. For example, the base film WP-BS may include two or more films bonded by an adhesive member.

The light blocking pattern WP-BZ partially overlaps the base film WP-BS. The light blocking pattern WP-BZ may be disposed on the rear surface of the base film WP-BS to define a bezel area of the display device DD, e.g., the non-display area DD-NDA (see FIG. 1).

For example, the window panel WP may further include a functional coating layer disposed on the upper surface of the base film WP-BS. The functional coating layer may include a fingerprint prevention layer, a reflection prevention layer, and a hard coating layer.

As illustrated in FIG. 2B, the display device DD may include a display panel DP, an input sensing layer ISL, a reflection prevention layer RPL, and a window layer WL. The adhesive members are omitted from the display device DD, and the input sensing layer ISL, the reflection prevention layer RPL, and the window layer WL may be formed on the base surface provided to the display panel DP by continuous processes. The stacking order of the input sensing layer ISL and the reflection prevention layer RPL may be changed.

As illustrated in FIG. 2C, the display device DD may not include a separate reflection prevention unit. In an embodiment, the display device DD may include a display panel DP, an input sensing layer ISL-1, and a window panel WP. The input sensing layer ISL-1 may further have a reflection prevention function.

In FIGS. 2A, 2B, and 2C, the input sensing unit is illustrated as entirely overlapping the display panel. However, this is an example, and the input sensing unit may overlap only a portion of the display area DD-DA, or may overlap only the non-display area DD-NDA. The input sensing unit may be a touch sensing panel that senses a touch of a user, or a fingerprint sensing panel that senses fingerprint information of a finger of a user. The pitch of the sensing electrodes and the widths of the sensing electrodes described below may be changed according to the purpose of the input sensing unit.

Figure 3:
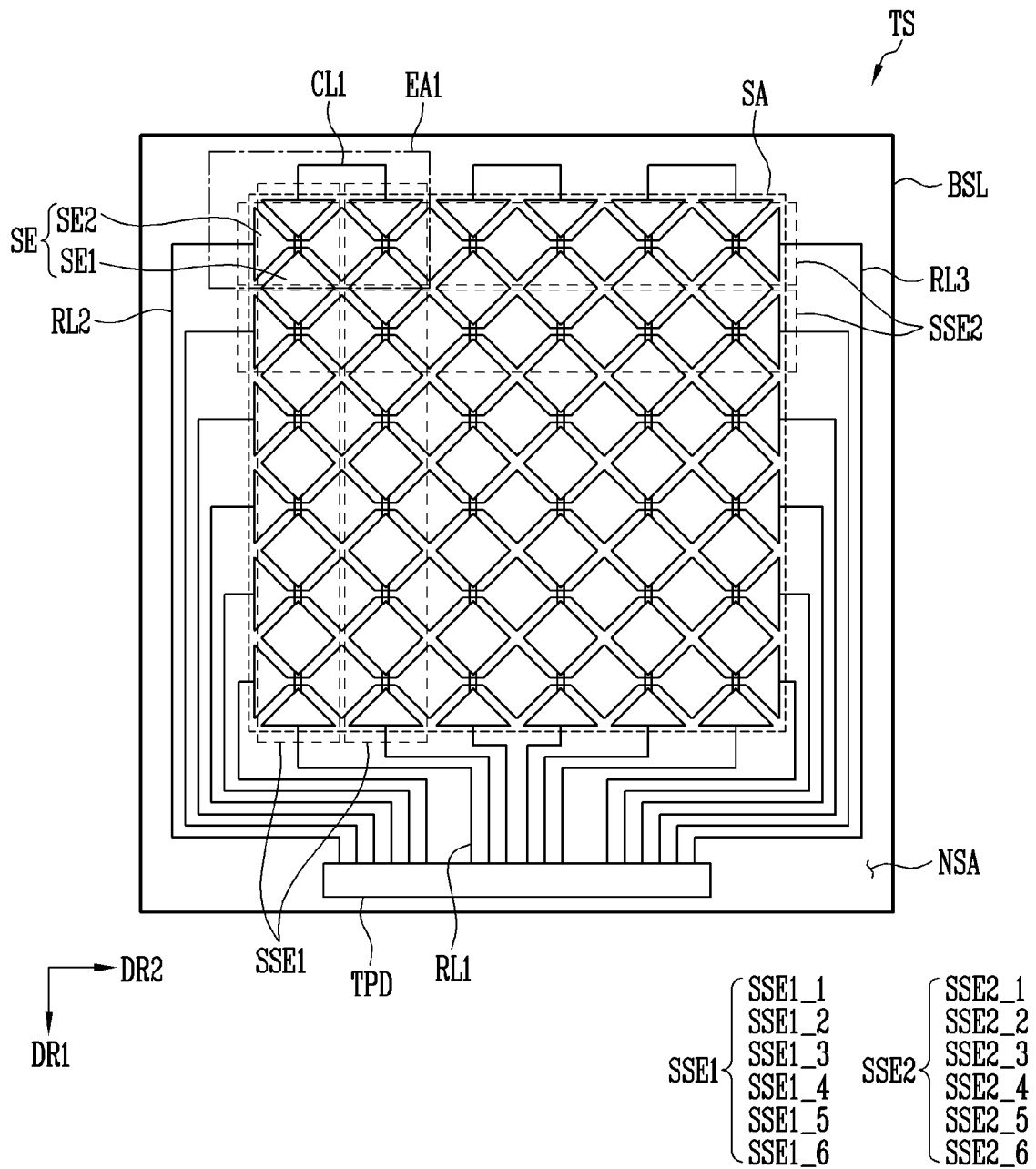
FIG. 3 is a plan view of an embodiment of a touch sensor of the display device of FIG. 1.

FIG. 3 is a plan view of an embodiment of a touch sensor of the display device of FIG. 1.

Referring to FIG. 3, a touch sensor TS may include a base in the form of a layer BSL, a sensing electrode SE, signal lines in the form of routing lines RL1, RL2, and RL3, and a first connector, which may be in the form of a connection pattern or a first connection line CL1. The touch sensor TS may further include a pad unit TPD connected to the routing lines RL1, RL2, and RL3.

The base layer BSL may include a transparent insulating material such as glass, quartz, ceramic, and plastic. When the base layer BSL includes plastic, the base layer BSL may be a flexible substrate. For example, the base layer BSL may include an organic material selected from the group consisting of polyethersulphone (PES), polyacrylate (PAR), polyetherimide (PEI), polyethylene naphthalate (PEN), polyethylene terephthalate (PET), polyphenylene sulfide (PPS), polyarylate, polyimide, polycarbonate (PC), cellulose triacetate (SAC), cellulose acetate propionate (CAP), and the like.

In an embodiment, the base layer BSL may include an inorganic material. For example, the base layer BSL may be the uppermost layer of the encapsulation layer of the display panel DP of FIG. 1. In this case, the base layer BSL may include a silicon nitride layer, a silicon oxynitride layer, a silicon oxide layer, a titanium oxide layer, an aluminum oxide layer, or the like.

The base layer BSL may include a sensing area SA that recognizes or senses a touch of a user and a non-sensing area NSA that does not recognize or sense a touch of a user. For example, the non-sensing area NSA may be a peripheral area at least partially surrounding the sensing area SA. In the drawings, the sensing area SA and the non-sensing area NSA are illustrated as having a generally rectangular shape, but embodiments are not limited thereto.

The sensing area SA may overlap a display area of a display panel that may be disposed on one surface of the base layer BSL. For example, the sensing area SA may have the same general shape as that of the display area. The non-sensing area NSA may overlap the non-display area of the display panel.

A plurality of sensing electrodes SE may be provided in the sensing area SA, and a pad unit TPD and routing lines RL1, RL2, and RL3 connecting the sensing electrodes SE to the pad unit TPD may be provided in the non-sensing area NSA. The pad unit TPD may include a plurality of pads respectively connected to the routing lines RL1, RL2, and RL3. The pads may be electrically connected to the sensing electrodes SE through the routing lines RL1, RL2, and RL3, respectively.

According to an embodiment, the non-sensing area NSA may include first, second, third, and fourth peripheral areas. The first, second, third, and fourth peripheral areas of the non-sensing area NSA may be adjacent to each side of the sensing area SA.

For example, the first peripheral area of the non-sensing area NSA may be adjacent to a first side of the sensing area SA (e.g., the lower side of the sensing area SA in a plan view of FIG. 3), and the second peripheral area of the non-sensing area NSA may be adjacent to a second side opposite to the first side of the sensing area SA (e.g., the upper side of the sensing area SA in a plan view of FIG. 3). In addition, the third peripheral area of the non-sensing area NSA may be adjacent to a third side of the sensing area SA (e.g., the left side of the sensing area SA in a plan view of FIG. 3), and the fourth peripheral area of the non-sensing area NSA may be adjacent to a fourth side opposite to the third side of the sensing area SA (e.g., the right side of the sensing area SA in a plan view of FIG. 3). Hereinafter, the following description will be given on the assumption that the first, second, third, and fourth peripheral areas of the non-sensing area NSA are adjacent to the first, second, third, and fourth sides of the sensing area SA, respectively.

The sensing electrode SE may include first sensing cells SE1 arranged in the first direction DR1 (columns in FIG. 3). The first sensing cells SE1 may be electrically connected to each other in the first direction DR1. For example, the first sensing cells SE1 may constitute a plurality of first sensing electrode lines SSE1 (e.g., first sensing electrodes).

The first sensing electrode lines SSE1 may extend in the first direction DR1 and may be arranged in the second direction DR2 (rows in FIG. 3). For example, the first sensing electrode lines SSE1 may include (1-1)th to (1-6)th sensing electrode lines SSE1_1 to SSE1_6 that are sequentially arranged in the second direction DR2. For example, the (1-1)th to (1-6)th sensing electrode lines SSE1_1 to SSE1_6 may be spaced apart from each other in the second direction DR2.

The sensing electrode SE may include second sensing cells SE2 arranged in the second direction DR2 intersecting the first direction DR1. The second sensing cells SE2 may be electrically connected in the second direction DR2. For example, the second sensing cells SE2 may constitute a plurality of second sensing electrode lines SSE2 (e.g., second sensing electrodes).

The second sensing electrode lines SSE2 may extend in the second direction DR2 and may be arranged in the first direction DR1. For example, the second sensing electrode lines SSE2 may include (2-1)th to (2-6)th sensing electrode lines SSE2_1 to SSE2_6 that are sequentially arranged in the first direction DR1. For example, the (2-1)th to (2-6)th sensing electrode lines SSE2_1 to SSE2_6 may be spaced apart from each other in the first direction DR1.

Although FIG. 3 illustrates that each of the first sensing electrode lines SSE1 and the second sensing electrode lines SSE2 includes six sensing electrode lines (SSE1_1 to SSE1_6, SSE2_1 to SSE2_6), this is only an example, and embodiments are not limited thereto.

In an embodiment, the first sensing cells SE1 arranged in the first direction DR1 may be electrically connected to the adjacent first sensing cells SE1 through a bridge, which may be in the form of a bridge pattern. However, this is only an example, and embodiments are not limited thereto. For example, the first sensing cells SE1 may be integrally formed with each other.

In an embodiment, the second sensing cells SE2 arranged in the second direction DR2 may be integrally formed with each other. However, this is only an example, and embodiments are not limited thereto. For example, the second sensing cells SE2 may be electrically connected to the adjacent second sensing cells SE2 through a bridge pattern.

Although FIG. 3 illustrates that the first and second sensing cells SE1 and SE2 have a generally rhomboidal shape, embodiments are not limited thereto. For example, the first and second sensing cells SE1 and SE2 may have other polygonal shapes.

According to an embodiment, at least some of the first and second sensing cells SE1 and SE2 may have a mesh shape in which fine patterns intersect each other. In this case, the sensing electrode SE may prevent the reduction in aperture ratio and the reduction in transmittance of the display device.

In an embodiment, both the first sensing electrode lines SSE1 (e.g., sensing electrode columns) and the second sensing electrode lines SSE2 (e.g., sensing electrode rows) may be connected to the pads of the pad unit TPD through conductive lines having a double routing structure. Therefore, an RC delay caused by resistances of the first sensing electrode lines SSE1 and the second sensing electrode lines SSE2 may be improved.

Hereinafter, one end of each of the first sensing electrode lines SSE1 is defined as a first end, and the other end thereof is defined as a second end. For example, when each of the first sensing electrode lines SSE1 includes n first sensing cells SE1, wherein n is a natural number, the first one of the first sensing cell SE1 may correspond to the first end of the first sensing electrode line SSE1, and the n-th one of the first sensing cell SE1 may correspond to the second end of the first sensing electrode line SSE1. In addition, one end of each of the second sensing electrode lines SSE2 is defined as a third end, and the other end thereof is defined as a fourth end. For example, when each of the second sensing electrode lines SSE2 includes m second sensing cells SE2, wherein m is a natural number, the first one of the second sensing cell SE2 may correspond to the third end of the second sensing electrode line SSE2, and the m-th one of the second sensing cell SE2 may correspond to the fourth end of the second sensing electrode line SSE2.

The first sensing electrode lines SSE1 including the first sensing cells SE1 may be connected to the pads of the pad unit TPD through the first routing lines RL1, respectively. According to embodiments, the first routing lines RL1 may be disposed on the first peripheral area of the non-sensing area NSA, and may be connected to the first end of each of the first sensing electrode lines SSE1.

In an embodiment, the second ends of the first sensing electrode lines adjacent to each other among the first sensing electrode lines SSE1 (e.g., the (1-1)th sensing electrode line SSE1_1 and the (1-2)th sensing electrode line SSE1_2) may be connected to each other through the first connection line CL1. The first connection lines CL1 may be disposed on the second peripheral area of the non-sensing area NSA.

As such, the conductive lines connected to the first sensing electrode lines SSE1 (e.g., the first routing lines RL1 and the first connection lines CL1) may have a double routing structure in which the conductive lines are connected to both the first and second ends of the first sensing electrode lines SSE1. Therefore, it is possible to improve an RC delay caused by resistances of the first sensing electrode lines SSE1 or the like.

In addition, since the first connection line CL1, which is the line connected to the second ends of the first sensing electrode lines SSE1, is disposed only in a portion of the non-sensing area NSA (e.g., the second peripheral area), the dead space due to the area of the non-sensing area NSA may be minimized.

The second sensing electrode lines SSE2 including the second sensing cells SE2 may be connected to the pads of the pad unit TPD through the second routing lines RL2, respectively. According to embodiments, the second routing lines RL2 may be disposed on the third peripheral area of the non-sensing area NSA, and may be connected to the third end of each of the second sensing electrode lines SSE2.

In addition, the second sensing electrode lines SSE2 (e.g., sensing electrode rows) including the second sensing cells SE2 may be connected to the pads of the pad unit TPD through the third routing lines RL3, respectively. According to embodiments, the third routing lines RL3 may be disposed on the fourth peripheral area of the non-sensing area NSA, and may be connected to the fourth end of each of the second sensing electrode lines SSE2.

For example, the conductive lines connected to the second sensing electrode lines SSE2 (e.g., the second routing lines RL2 and the third routing lines RL3) may have a double routing structure. Therefore, it is possible to improve an RC delay caused by resistances of the second sensing electrode lines SSE2 and the like. However, embodiments are not limited thereto. The conductive lines connected to the second sensing electrode lines SSE2 may have a single routing structure in which the routing lines are connected only to one end (e.g., the third end or the fourth end) of each of the second sensing electrode lines SSE2, and the routing lines are not connected to the other end (e.g., the fourth end or the third end) thereof.

One of the sensing electrode row (e.g., the first sensing electrode line SSE1) and the sensing electrode column (e.g., the second sensing electrode line SSE2) may receive a driving signal for touch sensing through the line connected thereto, and the other thereof may transmit a touch sensing signal through the line connected thereto.

The pad unit TPD may be connected to an external driving circuit such as a position detection circuit, and the sensing electrode SE and the external driving circuit may be electrically connected to each other.

In some embodiments, the touch sensing signal may correspond to an amount of change in mutual capacitance occurring between the first sensing electrode line SSE1 and the second sensing electrode line SSE2. For example, when a touch input occurs, the capacitance changes at a point when the touch input is provided or at a peripheral portion thereof. The external driving circuit may receive the amount of change in mutual capacitance between the first sensing electrode line SSE1 and the second sensing electrode line SSE2 as the touch sensing signal, and may use the amount of change to identify or sense the presence or absence of the touch input and/or its location.

Figure 4:
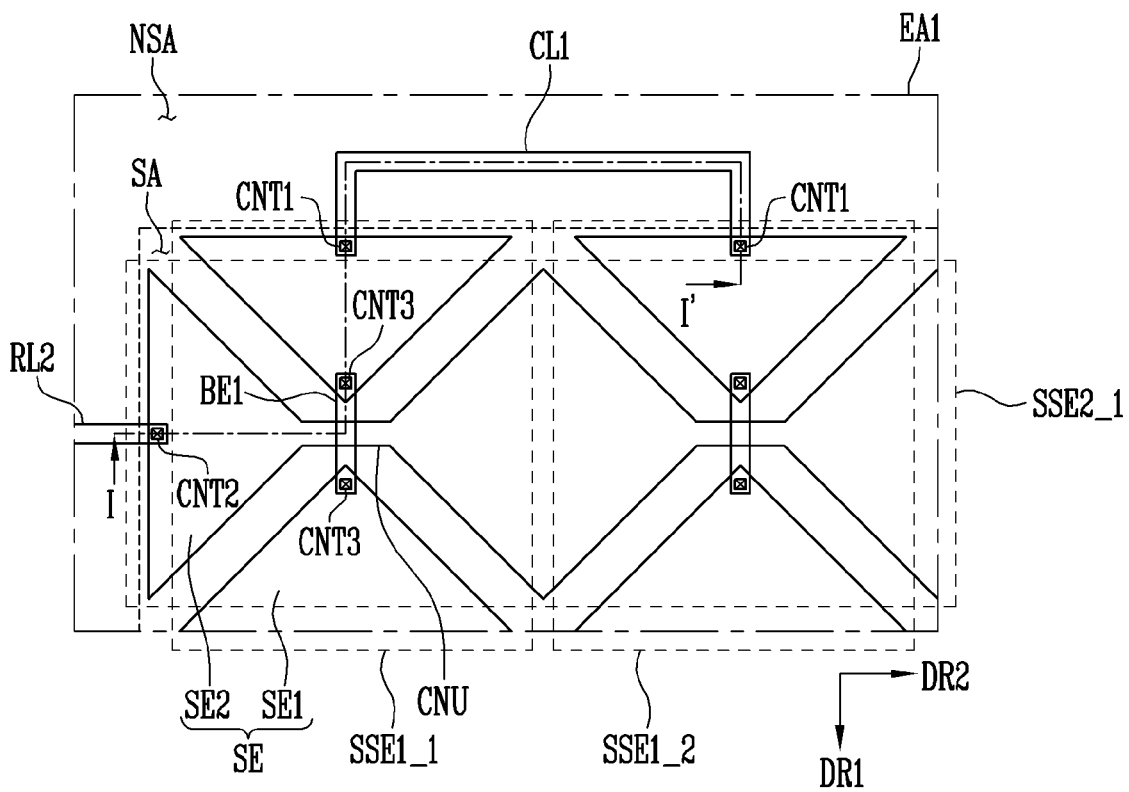
FIG. 4 is an enlarged view illustrating an example of a portion EA1 of the touch sensor of FIG. 3.
Figure 5:
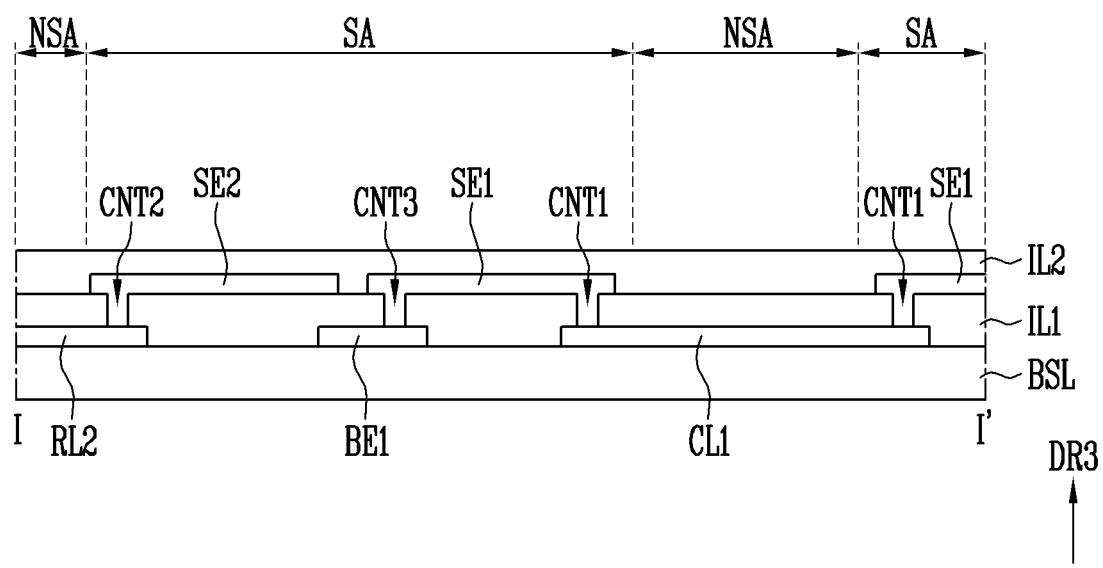
FIG. 5 is a cross-sectional view taken along lines I-I' of the touch sensor of FIG. 4.

FIG. 4 is an enlarged view illustrating an example of a portion EA1 of the touch sensor of FIG. 3, and FIG. 5 is a cross-sectional view taken along lines I-I' of the touch sensor of FIG. 4.

Referring to FIGS. 3, 4, and 5, the touch sensor TS may include conductive layers disposed with insulating layers (e.g., a first insulating layer IL1 and a second insulating layer IL2) therebetween. The conductive layers may include sensing electrodes SE, routing lines, first bridge patterns BE1, and first connection lines CL1.

The first bridge patterns BE1 may be disposed on the base layer BSL to overlap the sensing area SA, and the routing lines and the first connection lines CL1 may be disposed to overlap the non-sensing area NSA. Further, although FIGS. 4 and 5 illustrates only the second routing lines RL2 among the routing lines, the first and third routing lines RL1 and RL3 described with reference to FIG. 3 may be further disposed on the base layer BSL to overlap the non-sensing area NSA.

For example, the routing lines RL1, RL2, and RL3 and the first connection lines CL1 may be further disposed to overlap a portion of the sensing area SA so as to be connected to the first and second sensing cells SE1 and SE2.

The first bridge patterns BE1 may include a conductive material. For example, the conductive material may include a metal or an alloy thereof. Examples of the metal may include gold (Au), silver (Ag), aluminum (Al), molybdenum (Mo), chromium (Cr), titanium (Ti), nickel (Ni), neodymium (Nd), copper (Cu), platinum (Pt), and the like. In addition, the first bridge patterns BE1 may include a transparent conductive material. Examples of the transparent conductive material may include silver nanowire (AgNW), indium tin oxide (ITO), indium zinc oxide (IZO), aluminum-doped zinc oxide (AZO), indium tin zinc oxide (ITZO), zinc oxide (ZnO), and tin oxide ($SnO_2$), carbon nanotube, graphene, and the like.

In some embodiments, the first bridge patterns BE1 may have a single layer structure or a multilayer structure. When the first bridge patterns BE1 have a multilayer structure, the first bridge patterns BE1 may include multilayer metal layers. For example, the first bridge patterns BE1 may have a multilayer structure (e.g., a three-layer structure) of titanium/aluminum/titanium.

The routing lines RL1, RL2, and RL3 may include a conductive material. In some embodiments, the routing lines RL1, RL2, and RL3 may include the same material as that of the first bridge patterns BE1, or may include one or more materials selected from materials, of which the first bridge patterns BE1 are formed. In some embodiments, the routing lines RL1, RL2, and RL3 may have a single layer structure or a multilayer structure. For example, the routing lines RL1, RL2, and RL3 may have the three-layer structure of titanium/aluminum/titanium. However, embodiments are not limited thereto, and the routing lines RL1, RL2, and RL3 may include a material different from that of the first bridge patterns BE1.

The first connection line CL1 may include a conductive material. In some embodiments, the first connection line CL1 may include the same material as that of the first bridge patterns BE1, or may include one or more materials selected from materials, of which the first bridge patterns BE1 are formed. In some embodiments, the first connection line CL1 may have a single layer structure or a multilayer structure. For example, the first connection line CL1 may have a three-layer structure of titanium/aluminum/titanium. However, embodiments are not limited thereto, and the first connection line CL1 may include a material different from that of the first bridge patterns BE1.

On the sensing area SA and the non-sensing area NSA on the base layer BSL, the first insulating layer IL1 may be disposed to cover the routing lines RL1, RL2, and RL3, the first bridge patterns BE1, and the first connection line CL1.

The first insulating layer IL1 may include an inorganic layer, for example, at least one of silicon nitride, silicon oxynitride, silicon oxide, titanium oxide, or aluminum oxide.

The first and second sensing cells SE1 and SE2 may be disposed on the first insulating layer IL1 to overlap the sensing area SA.

The first and second sensing cells SE1 and SE2 may include a conductive material. For example, the conductive material may include a metal or an alloy thereof. Examples of the metal may include gold (Au), silver (Ag), aluminum (Al), molybdenum (Mo), chromium (Cr), titanium (Ti), nickel (Ni), neodymium (Nd), copper (Cu), platinum (Pt), and the like. In addition, the first and second sensing cells SE1 and SE2 may include a transparent conductive material. Examples of the transparent conductive material may include silver nanowire (AgNW), indium tin oxide (ITO), indium zinc oxide (IZO), aluminum-doped zinc oxide (AZO), indium tin zinc oxide (ITZO), zinc oxide (ZnO), and tin oxide ($SnO_2$), carbon nanotube, graphene, and the like.

In some embodiments, the first and second sensing cells SE1 and SE2 may have a single layer structure or a multilayer structure. When the first and second sensing cells SE1 and SE2 have a multilayer structure, the first and second sensing cells SE1 and SE2 may include multilayer metal layers. For example, the first and second sensing cells SE1 and SE2 may have a three-layer structure of titanium/aluminum/titanium.

The first sensing cells SE1 adjacent in the first direction DR1 may be connected to one end and the other end of the first bridge pattern BE1 through third contact holes CNT3 passing through the first insulating layer IL1. Therefore, the first sensing cells SE1 adjacent to each other in the first direction DR1 may be electrically connected to each other through the first bridge pattern BE1 to constitute the first sensing electrode line SSE1.

The second sensing cells SE2 adjacent to each other in the second direction DR2 may be integrally formed with connection units CNU. Therefore, the second sensing cells SE2 adjacent to each other in the second direction DR2 may be electrically connected to each other to constitute the second sensing electrode line SSE2.

For example, since the first bridge patterns BE1 connecting the adjacent first sensing cells SE1 and the connection unit CNU between the adjacent second sensing cells SE2 are spaced apart from each other with the first insulating layer IL1 therebetween, it is possible to prevent an electrical short circuit between the first sensing electrode line SSE1 and the second sensing electrode line SSE2. Therefore, the mutual capacitance described with reference to FIG. 3 may be generated between the first sensing electrode line SSE1 and the second sensing electrode line SSE2.

One of the second sensing cells SE2 included in each of the second sensing electrode lines SSE2 may be connected to the second routing line RL2 through the second contact hole CNT2 passing through the first insulating layer IL1. For example, the second sensing cell SE2 corresponding to the third end of the second sensing electrode line SSE2 among the second sensing cells SE2 may be connected to the second routing line RL2 through the second contact hole CNT2.

For example, the other one of the second sensing cells SE2 included in each of the second sensing electrode lines SSE2 may be connected to the second routing line RL2 through the contact hole passing through the first insulating layer IL1. For example, the second sensing cell SE2 corresponding to the fourth end of the second sensing electrode line SSE2 among the second sensing cells SE2 may be connected to the second routing line RL2 through the contact hole.

In an embodiment, the second ends of the first sensing electrode lines adjacent to each other among the first sensing electrode lines SSE1 (e.g., the (1-1)th sensing electrode line SSE1_1 and the (1-2)th sensing electrode line SSE1_2) may be connected to each other through the first connection line CL1. For example, the first sensing cell SE1 corresponding to the second end of the (1-1)th sensing electrode line SSE1_1 may be connected to one end of the first connection line CL1 through the first contact hole CNT1 passing through the first insulating layer IL1. In addition, the first sensing cell SE1 corresponding to the second end of the (1-2)th sensing electrode line SSE1_2 may be connected to the other end of the first connection line CL1 through the first contact hole CNT1 passing through the first insulating layer IL1. Therefore, the second ends of the (1-1)th sensing electrode line SSE1_1 and the (1-2)th sensing electrode line SSE1_2 adjacent to each other may be electrically connected through the first connection line CL1.

On the sensing area SA and the non-sensing area NSA on the first insulating layer IL1, the second insulating layer IL2 may be disposed to cover the first and second sensing cells SE1 and SE2.

The second insulating layer IL2 may include an inorganic layer, for example, at least one of silicon nitride, silicon oxynitride, silicon oxide, titanium oxide, or aluminum oxide.

Figure 6:
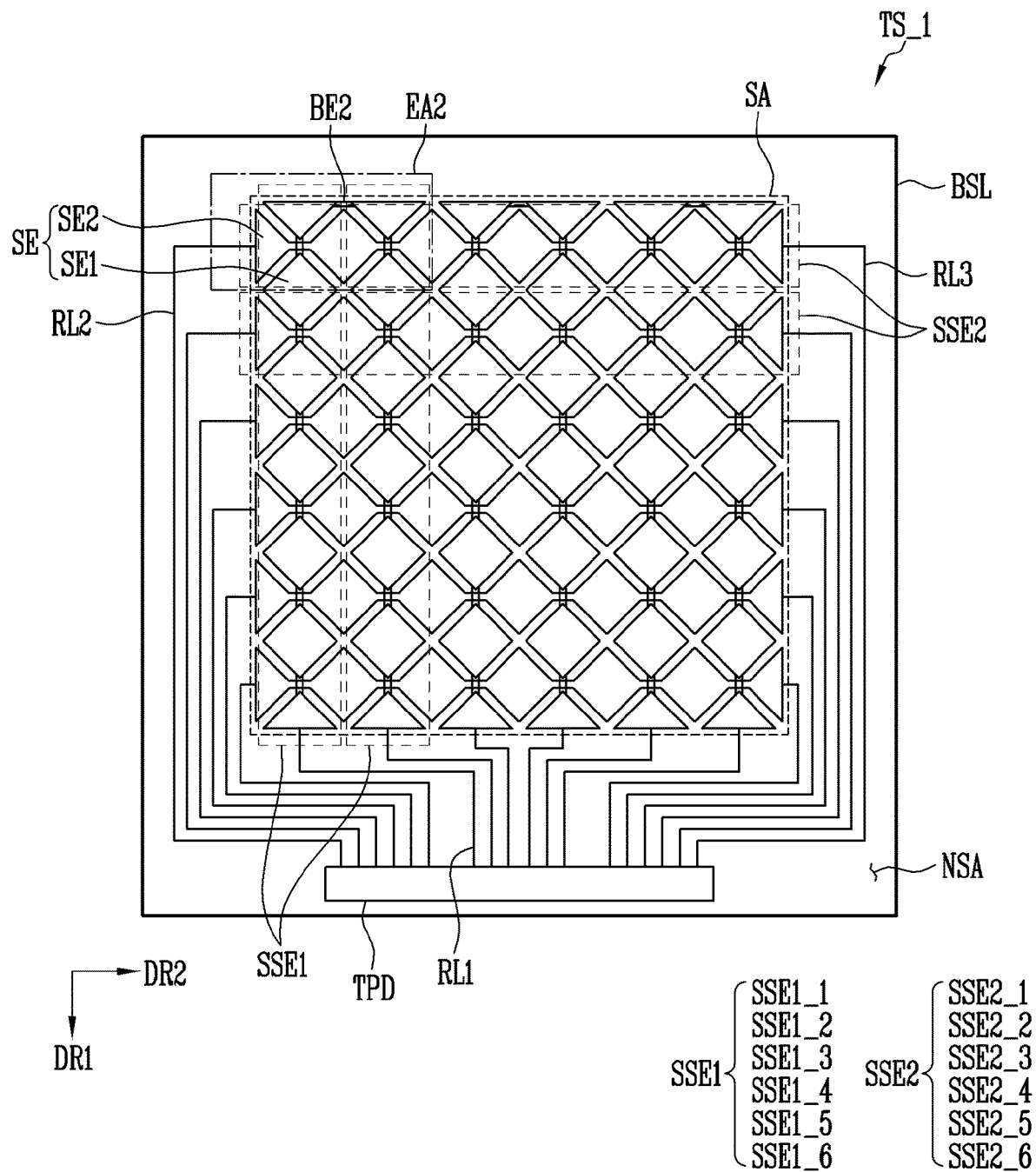
FIG. 6 is a plan view of another embodiment of the touch sensor of the display device of FIG. 1.
Figure 7:
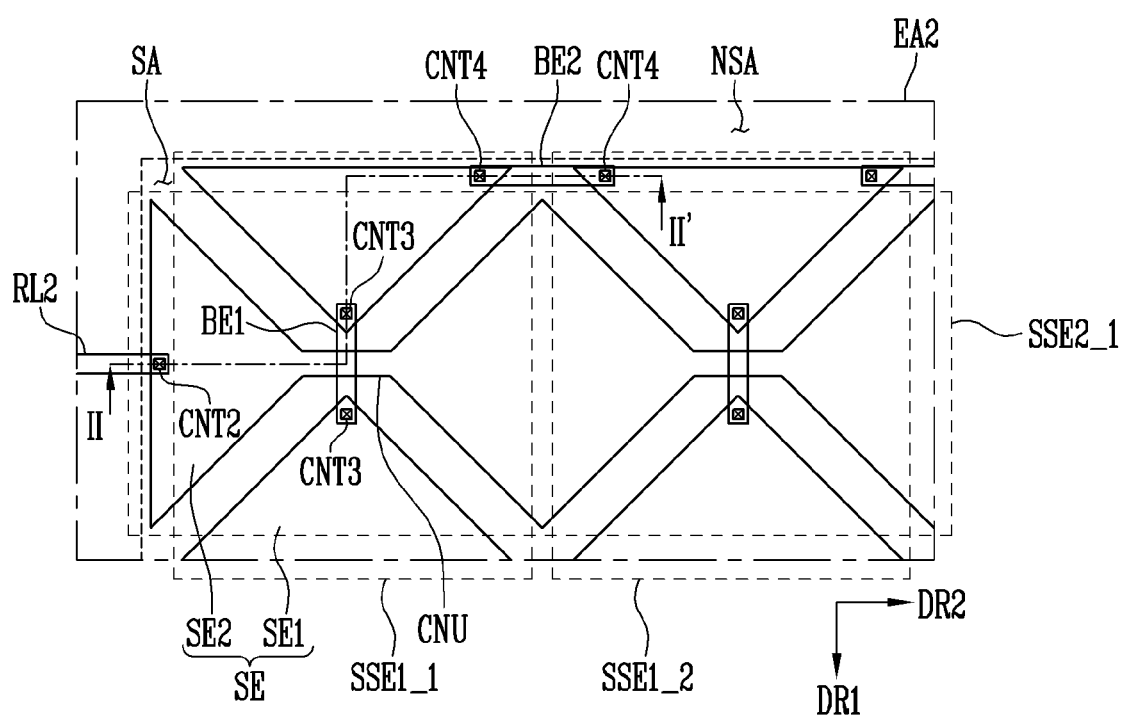
FIG. 7 is an enlarged view illustrating an example of a portion EA2 of the touch sensor of FIG. 6.
Figure 8:
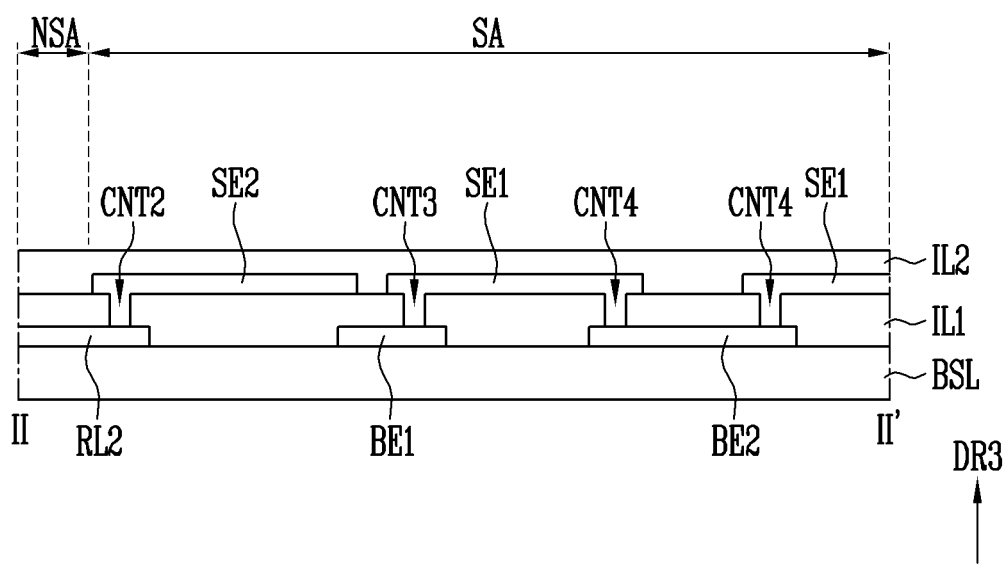
FIG. 8 is a cross-sectional view taken along lines II-II' of the touch sensor of FIG.
Figure 9:
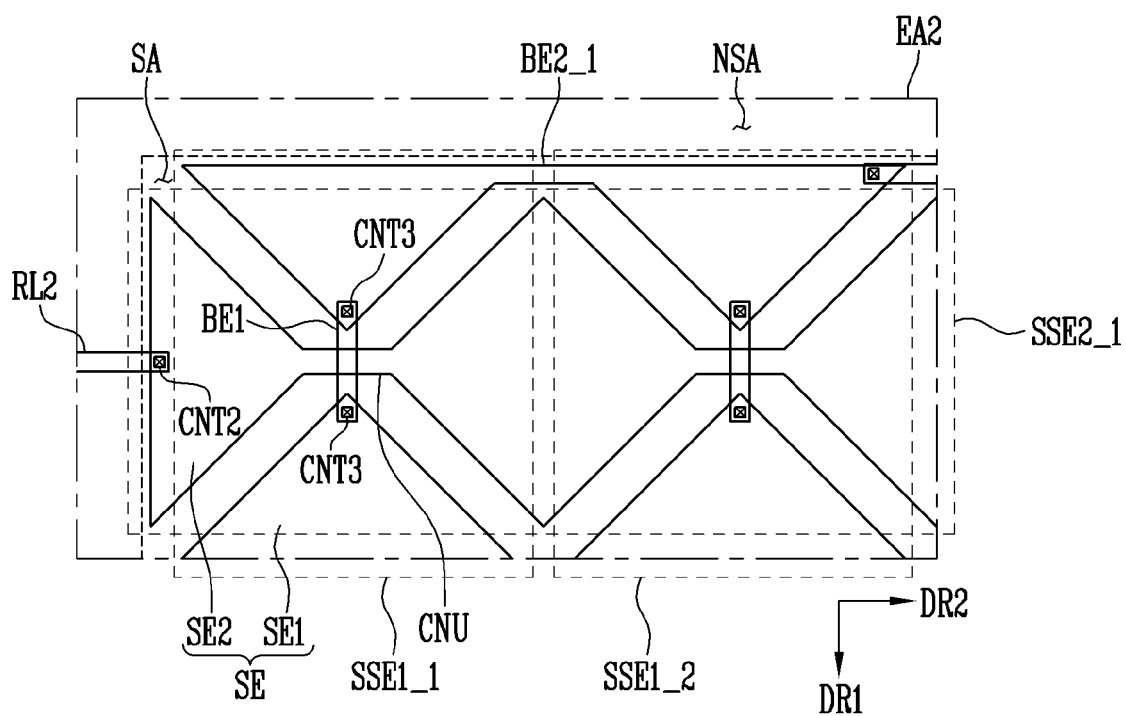
FIG. 9 is an enlarged view illustrating another example of a portion EA2 of the touch sensor of FIG. 6.

FIG. 6 is a plan view of another embodiment of the touch sensor of the display device of FIG. 1, FIG. 7 is an enlarged view illustrating an example of a portion EA2 of the touch sensor of FIG. 6, FIG. 8 is a cross-sectional view taken along lines II-II' of the touch sensor of FIG. 7, and FIG. 9 is an enlarged view illustrating another example of a portion EA2 of the touch sensor of FIG. 6. In FIGS. 6, 7, 8, and 9, detailed descriptions of components similar or identical to those described above will be omitted to avoid redundancy.

Referring to FIG. 6, a touch sensor TS_1 may include a base layer BSL, a sensing electrode SE, routing lines RL1, RL2, and RL3, and a first connection pattern (e.g., a second bridge pattern BE2).

In an embodiment, the second ends of the first sensing electrodes adjacent to each other among the first sensing electrode lines SSE1 (e.g., the (1-1)th sensing electrode line SSE1_1 and the (1-2)th sensing electrode line SSE1_2) may be connected to each other through the second bridge pattern BE2. The second bridge pattern BE2 may be disposed on the sensing area SA.

Further, referring to 7 and 8, the second bridge pattern BE2 may be disposed on the base layer BSL to overlap the sensing area SA.

The second bridge pattern BE2 may include a conductive material. In some embodiments, the second bridge pattern BE2 may include the same material as that of the first bridge pattern BE1, or may include one or more materials selected from materials, of which the first bridge patterns BE1 are formed. In some embodiments, the second bridge pattern BE2 may have a single layer structure or a multilayer structure. For example, the second bridge patterns BE2 may have a three-layer structure of titanium/aluminum/titanium. However, embodiments are not limited thereto, and the second bridge pattern BE2 may include a material different from that of the first bridge patterns BE1.

In an embodiment, the second ends of the first sensing electrodes adjacent to each other among the first sensing electrode lines SSE1 (e.g., the (1-1)th sensing electrode line SSE1_1 and the (1-2)th sensing electrode line SSE1_2) may be connected to each other through the second bridge pattern BE2. For example, the first sensing cell SE1 corresponding to the second end of the (1-1)th sensing electrode line SSE1_1 may be connected to one end of the second bridge pattern BE2 through the fourth contact hole CNT4 passing through the first insulating layer IL1. In addition, the first sensing cell SE1 corresponding to the second end of the (1-2)th sensing electrode line SSE1_2 may be connected to the other end of the second bridge pattern BE2 through the fourth contact hole CNT4 passing through the first insulating layer IL1. Therefore, the second ends of the (1-1)th sensing electrode line SSE1_1 and the (1-2)th sensing electrode line SSE1_2 adjacent to each other may be electrically connected through the second bridge pattern BE2.

As such, since the second bridge pattern BE2 connecting the second ends of the first sensing electrode lines SSE1 is disposed in the sensing area SA, the dead space due to the area of the non-sensing area NSA may be further minimized.

The description in FIGS. 7 and 8, has been given based on a case in which the second bridge pattern BE2 for connecting the second ends of the first sensing electrode lines SSE1 is formed on a layer different from the first sensing cells SE1 and connected through the contact hole (e.g., the fourth contact hole CNT4), but embodiments are not limited thereto.

For example, referring to FIG. 9, the first sensing cells SE1 respectively corresponding to the first sensing cells SE1 the second ends of the first sensing electrode lines (e.g., the (1-1)th sensing electrode line SSE1_1 and the (1-2)th sensing electrode line SSE1_2) adjacent to each other among the first sensing electrode lines SSE1 may be integrally formed with each other and thus electrically connected to each other.

Specifically, the second bridge pattern BE2_1 for connecting the second ends of the first sensing electrode lines SSE1 may be disposed on the same layer as the first sensing cells SE1 on the sensing area SA. In addition, since the first sensing cells SE1 respectively corresponding to the second ends of the first sensing electrode lines adjacent to each other among the first sensing electrode lines SSE1 are integrally formed with the second bridge pattern BE2_1, the second ends of the first sensing electrode lines adjacent to each other among the first sensing electrode lines SSE1 may be electrically connected to each other.

Figure 10:
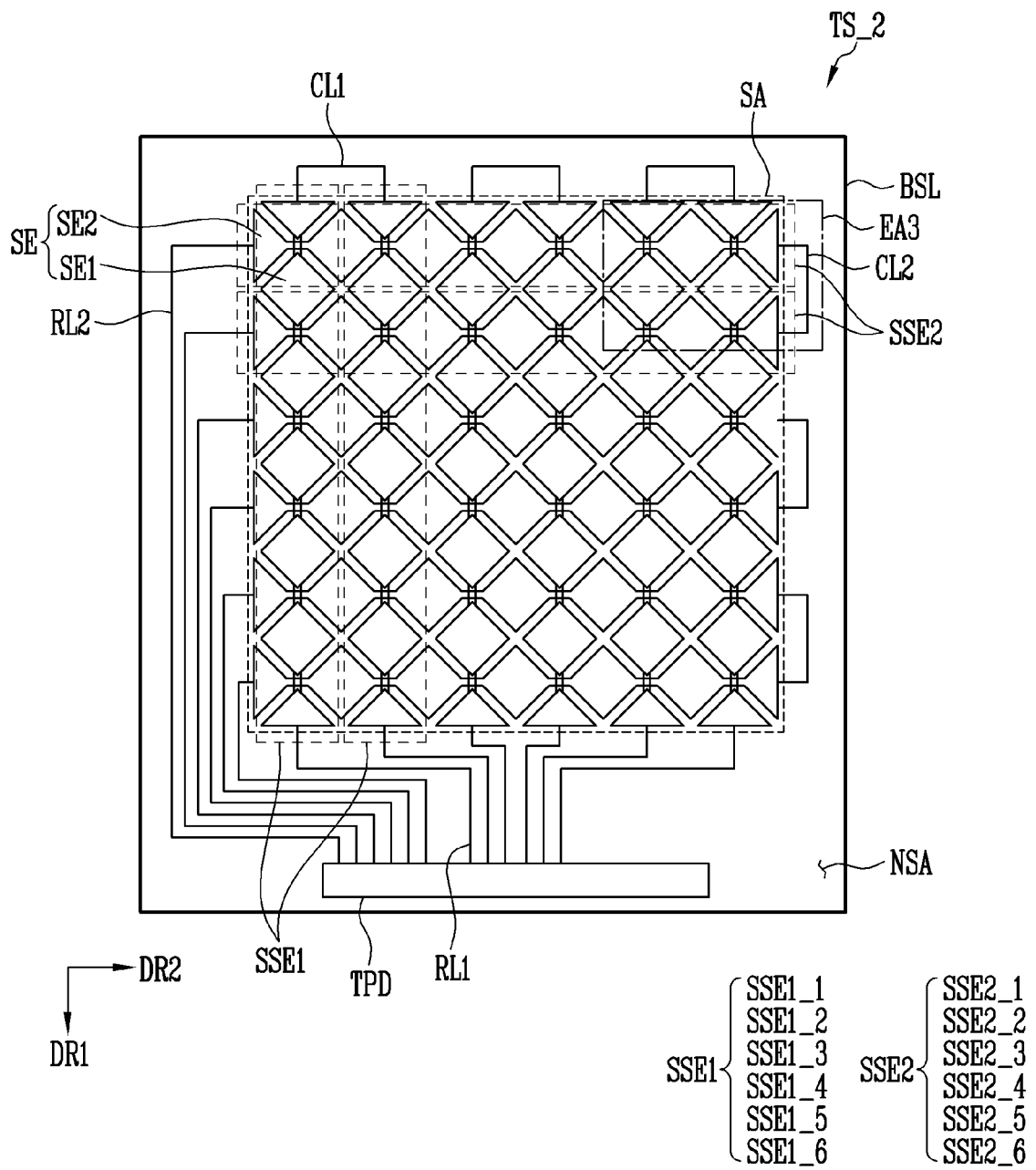
FIG. 10 is a plan view of another embodiment of the touch sensor of the display device of FIG. 1.
Figure 11:
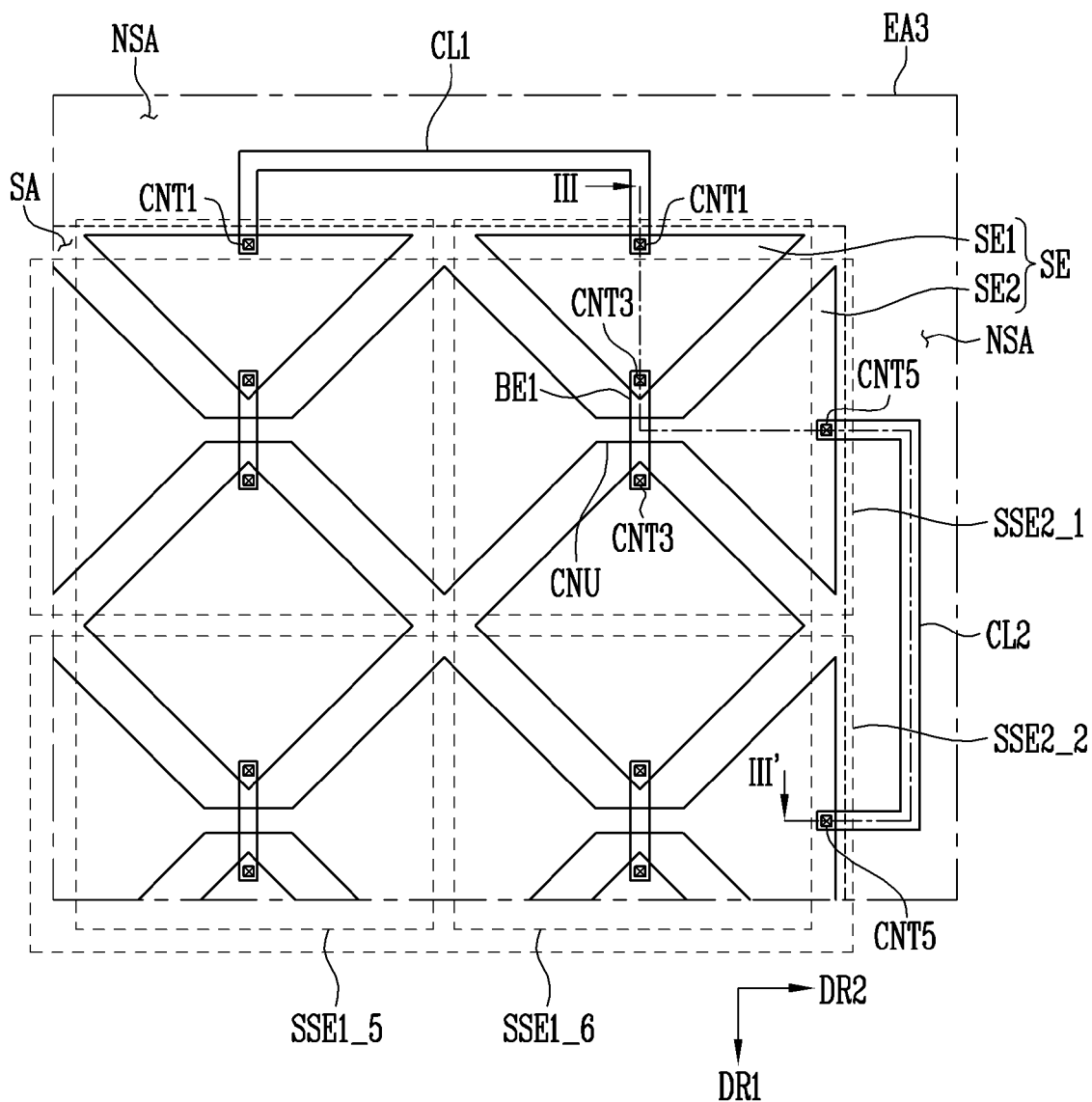
FIG. 11 is an enlarged view illustrating an example of a portion EA3 of the touch sensor of FIG. 10.
Figure 12:
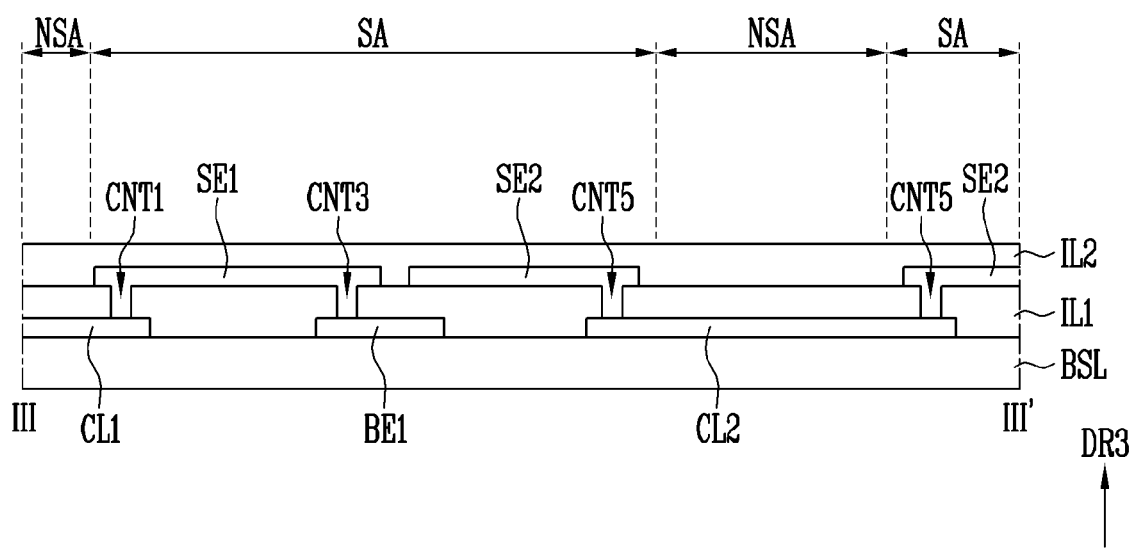
FIG. 12 is a cross-sectional view taken along lines III-III' of the touch sensor of FIG. 11.

FIG. 10 is a plan view of another embodiment of the touch sensor of the display device of FIG. 1, FIG. 11 is an enlarged view illustrating an example of a portion EA3 of the touch sensor of FIG. 10, and FIG. 12 is a cross-sectional view taken along lines III-III' of the touch sensor of FIG. 11. In FIGS. 10, 11, and 12, detailed descriptions of components similar or identical to those in the at least one embodiment described above will be omitted to avoid redundancy.

Referring to FIG. 10, a touch sensor TS_2 of FIG. 10 may include a base layer BSL, a sensing electrode SE, routing lines RL1 and RL2, a first connection pattern (e.g., a first connection line CL1), and a second connection pattern (e.g., a second connection line CL2).

In an embodiment, fourth ends of the second sensing electrode lines adjacent to each other among the second sensing electrode lines SSE2 (e.g., the (2-1)th sensing electrode line SSE2_1 and the (2-2)th sensing electrode line SSE2_2) may be connected to each other through the second connection line CL2. The second connection lines CL2 may be disposed on a fourth peripheral area of a non-sensing area NSA.

Since the second connection line CL2, which is the line connected to the fourth ends of the second sensing electrode lines SSE2, is disposed only in a portion of the non-sensing area NSA (e.g., the fourth peripheral area), the dead space due to the area of the non-sensing area NSA may be minimized.

Further referring to FIGS. 11 and 12, first bridge patterns BE1 may be disposed on the base layer BSL to overlap the sensing area SA, and the first connection line CL1 and the second connection line CL2 may be disposed to overlap the non-sensing area NSA. For example, routing lines RL1 and RL2 may be further disposed on the base layer BSL by overlapping the non-sensing area NSA.

The second connection line CL2 may include a conductive material. In some embodiments, the second connection line CL2 may include the same material as that of the first bridge patterns BE1, or may include one or more materials selected from materials, of which the first bridge patterns BE1 are formed. In some embodiments, the second connection line CL2 may have a single layer structure or a multilayer structure. For example, the second connection line CL2 may have a three-layer structure of titanium/ aluminum/titanium. However, embodiments are not limited thereto, and the second connection line CL2 may include a material different from that of the first bridge patterns BE1.

In an embodiment, fourth ends of the second sensing electrode lines adjacent to each other among the second sensing electrode lines SSE2 (e.g., the (2-1)th sensing electrode line SSE2_1 and the (2-2)th sensing electrode line SSE2_2) may be connected to each other through the second connection line CL2. For example, the second sensing cell SE2 corresponding to the fourth end of the (2-1)th sensing electrode line SSE2_1 may be connected to one end of the second connection line CL2 through a fifth contact hole CNT5 passing through the first insulating layer IL1. In addition, the second sensing cell SE2 corresponding to the fourth end of the (2-2)th sensing electrode line SSE2_2 may be connected to the other end of the second connection line CL2 through a fifth contact hole CNT5 passing through the first insulating layer IL1. Therefore, the fourth ends of the (2-1)th sensing electrode line SSE2_1 and the (2-2)th sensing electrode line SSE2_2 adjacent to each other may be electrically connected through the second connection line CL2.

Although FIGS. 10, 11, and 12 illustrate that the fourth ends of the second sensing electrode lines adjacent to each other among the second sensing electrode lines SSE2 (e.g., the (2-1)th sensing electrode line SSE2_1 and the (2-2)th sensing electrode line SSE2_2) are connected to each other through the second connection line CL2, embodiments are not limited thereto, and the third ends of the second sensing electrode lines adjacent to each other among the second sensing electrode lines SSE2 (e.g., the (2-1)th sensing electrode line SSE2_1 and the (2-2)th sensing electrode line SSE2_2) may be connected to each other through the connection line.

In addition, similar to the above description with reference to FIGS. 6, 7, 8, and 9, two of the ends (e.g., the third ends or the fourth ends) of the second sensing electrode lines adjacent to each other among the second sensing electrode lines SSE2 (e.g., the (2-1)th sensing electrode line SSE2_1 and the (2-2)th sensing electrode line SSE2_2) may be electrically connected to each other through the bridge pattern disposed on the sensing area SA.

Touch sensor constructed according to the principles and embodiments may include a connector, such as a connection pattern connecting adjacent sensing electrodes to each other. Therefore, the dead space may be minimized.

However, the effects of the embodiments of the invention are not limited to the above-described effects, and may be changed without departing from the spirit and scope of the present invention.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A touch sensor for a display device, the touch sensor comprising:
   a base including a sensing area and a non-sensing area;
   first sensing electrodes disposed on the sensing area, extending in a first direction, and arranged in a second direction different from the first direction;
   second sensing electrodes disposed on the sensing area, extending in the second direction, and arranged in the first direction;
   first signal lines disposed on a first peripheral area of the non-sensing area and being connected to first portions of the first sensing electrodes, respectively; and
   a first connector connected to second portions of the first sensing electrodes; and
   second signal lines disposed on a third peripheral area of the non-sensing area and being connected to third portions of the second sensing electrodes, respectively; and
   a second connector connected to fourth portions of the second sensing electrodes, respectively,
   wherein the first connector electrically connects adjacent ones of first sensing electrodes to each other,
   wherein the first connector is disposed on a second peripheral area of the non-sensing area opposite to the first peripheral area of the non-sensing area, and
   wherein the second connector electrically connects adjacent ones of the second sensing electrodes to each other.

2. The touch sensor of claim 1, wherein:
   the first peripheral area of the non-sensing area is adjacent to a first side of the sensing area, and
   the second peripheral area of the non-sensing area is adjacent to a second side of the sensing area opposite to the first side of the sensing area.

3. The touch sensor of claim 1, wherein the second connector is disposed on a fourth peripheral area of the non-sensing area.

4. The touch sensor of claim 3, wherein:
   the third peripheral area of the non-sensing area is adjacent to a third side of the sensing area, and
   the fourth peripheral area of the non-sensing area is adjacent to a fourth side opposite to the third side of the sensing area.

5. The touch sensor of claim 2, wherein:
   the base comprises a base layer,
   the second connector comprises a second connection pattern,
   the third portions of the second sensing electrodes comprise third ends, and
   the fourth portions of the second sensing electrodes comprise fourth ends opposite the third ends,
   wherein the touch sensor further comprises an insulating layer, and
   wherein the second connection pattern is disposed on the base layer,
   the insulating layer is disposed on the base layer to cover the second connection pattern,
   the second sensing electrodes are disposed on the insulating layer, and
   the fourth ends of the second sensing electrodes are connected to the second connection pattern through a contact hole passing through the insulating layer.

6. The touch sensor of claim 1, wherein the second connector is disposed on the sensing area.

7. The touch sensor of claim 6, wherein the fourth portions of the adjacent ones of second sensing electrodes are integrally formed with the second connector.

8. The touch sensor of claim 1, further comprising third signal lines disposed on a fourth peripheral area of the non-sensing area and connected to fourth portions of respective ones of the second sensing electrodes.

9. The touch sensor of claim 1, wherein the first connector comprises a first connection pattern disposed on the sensing area.

10. The touch sensor of claim 9, wherein the second portions of the adjacent ones of first sensing electrodes are integrally formed with the first connection pattern.

11. The touch sensor of claim 1, wherein each of the first sensing electrodes comprises first sensing cells arranged in the first direction, and
   each of the second sensing electrodes comprises second sensing cells arranged in the second direction.

12. The touch sensor of claim 11, further comprising a bridge connecting adjacent ones of the first sensing cells to each other.

13. The touch sensor of claim 12, wherein the bridge comprises a bridge pattern and further comprising an insulating layer,
  wherein the bridge pattern is disposed on the base,
  the insulating layer is disposed on the base to cover the bridge pattern,
  the first sensing cells and the second sensing cells are disposed on the insulating layer, and
  the first sensing cells are connected to the bridge pattern through a contact hole passing through the insulating layer.

14. A touch sensor for a display device, the touch sensor comprising:
  a base including a sensing area and a non-sensing area;
  first sensing electrodes disposed on the sensing area, extending in a first direction, and arranged in a second direction different from the first direction;
  second sensing electrodes disposed on the sensing area, extending in the second direction, and arranged in the first direction;
  first signal lines disposed on a first peripheral area of the non-sensing area and being connected to first portions of the first sensing electrodes, respectively; and
  a first connector connected to second portions of the first sensing electrodes,
  wherein the first connector electrically connects adjacent ones of first sensing electrodes to each other,
  wherein:
    the base comprises a base layer,
    the first connector comprises a first connection pattern,
    the first portions of the first sensing electrodes comprise first ends, and
    the second portions of the first sensing electrodes comprise second ends opposite the first ends,
  wherein the touch sensor further comprises an insulating layer, and
  wherein the first connection pattern is disposed on the base layer,
  the insulating layer is disposed on the base layer to cover the first connection pattern,
  the first sensing electrodes are disposed on the insulating layer, and
  the second ends of the first sensing electrodes are connected to the first connection pattern through a contact hole passing through the insulating layer.

15. A display device comprising:
  a display panel; and
  a touch sensor disposed on the display panel,
  wherein the touch sensor comprises:
  a base including a sensing area and a non-sensing area;
  first sensing electrodes disposed on the sensing area, extending in a first direction, and arranged in a second direction different from the first direction;
  second sensing electrodes disposed on the sensing area, extending in the second direction, and arranged in the first direction;
  first signals lines disposed on a first peripheral area of the non-sensing area and being connected to first portions of the first sensing electrodes, respectively; and
  a first connector connected to second portions of the first sensing electrodes; and
  second signal lines disposed on a third peripheral area of the non-sensing area and being connected to third portions of the second sensing electrodes, respectively; and
  a second connector connected to fourth portions of the second sensing electrodes, respectively,
  wherein the first connector electrically connects adjacent ones of first sensing electrodes to each other,
  wherein the first connector is disposed on a second peripheral area of the non-sensing area opposite to the first peripheral area of the non-sensing area, and
  wherein the second connector electrically connects adjacent ones of the second sensing electrodes to each other.

16. The display device of claim 15, wherein the display panel comprises:
  a substrate including a display area and a non-display area;
  a circuit element disposed on the substrate; and
  a display element disposed on the circuit element.

17. The display device of claim 16, wherein:
  the sensing area overlaps the display area, and
  the non-sensing area overlaps the non-display area.

* * * * *